US 9,431,702 B2

(12) United States Patent
Hartenstein (10) Patent No.: US 9,431,702 B2
(45) Date of Patent: Aug. 30, 2016

(54) MIMO ANTENNA SYSTEM HAVING BEAMFORMING NETWORKS (75) Inventor: Abraham Hartenstein, Chatsworth, CA (US)

(73) Assignee: XIRRUS, INC., Thousand Oaks, CA (US)

( * ) Notice: Subject to any disclaimer, the term of this patent is extended or adjusted under 35 U.S.C. 154(b) by 0 days.

(21) Appl. No.: 13/115,091

(22) Filed: May 24, 2011

(65) Prior Publication Data

US 2012/0300682 A1 Nov. 29, 2012

(51) Int. Cl.
H01Q 3/24 (2006.01)
H01Q 21/20 (2006.01)
H04B 7/06 (2006.01)
H04B 7/04 (2006.01)
H04B 7/10 (2006.01)
H01Q 5/40 (2015.01)

(52) U.S. Cl.
CPC ............. H01Q 3/24 (2013.01); H01Q 5/40 (2015.01); H01Q 21/205 (2013.01); H04B 7/0617 (2013.01); H04B 7/0408 (2013.01); H04B 7/0413 (2013.01); H04B 7/10 (2013.01)

(58) Field of Classification Search
CPC ........ H01Q 3/24; H01Q 5/40; H01Q 21/205; H04B 7/0617; H04B 7/0408; H04B 7/0413; H04B 7/10
See application file for complete search history.

(56) References Cited

U.S. PATENT DOCUMENTS

| 8,090,374 | B2* | 1/2012 | Rezvani et al. | 455/437 |
| 2007/0243826 | A1* | 10/2007 | Liu | H04B 17/3911 455/67.11 |
| 2008/0227487 | A1* | 9/2008 | Daniels et al. | 455/553.1 |
| 2009/0322608 | A1* | 12/2009 | Adams et al. | 342/368 |
| 2010/0029197 | A1* | 2/2010 | Judd et al. | 455/11.1 |
| 2010/0259446 | A1* | 10/2010 | Corman et al. | 342/373 |
| 2010/0296439 | A1* | 11/2010 | Leung et al. | 370/328 |
| 2011/0130163 | A1* | 6/2011 | Saban et al. | 455/517 |
| 2012/0287866 | A1* | 11/2012 | Petrovic et al. | 370/329 |

* cited by examiner

Primary Examiner — Alpus H Hsu
Assistant Examiner — Walter Divito
(74) Attorney, Agent, or Firm — Francisco A. Rubio-Campos; Apogee Law Group P.C.

(57) ABSTRACT

An antenna system connected to a radio in a Multiple-Input, Multiple-Output (MIMO) arrangement and configured to communicate in an area of coverage. The antenna system includes a plurality of antenna elements. The plurality of antenna elements further includes a first plurality of antenna elements configured to communicate on a first frequency band and a second plurality of antenna elements configured to communicate on a second frequency band. A plurality of MIMO-configured radio ports on the radio communicates radio signals to and from the antenna elements. A beam-forming network is connected to at least two of the first plurality of antenna elements and to at least two radio ports. The beam-forming network is configured to form space diversity beams in the area of coverage.

26 Claims, 5 Drawing Sheets

MIMO ANTENNA SYSTEM HAVING BEAMFORMING NETWORKS

BACKGROUND OF THE INVENTION

1. Field of the Invention

This invention relates generally to communication devices and more particularly to antennas for Multiple-Input, Multiple-Output (MIMO) media access controllers.

2. Related Art

The use of wireless communication devices for data networking is growing at a rapid pace. Data networks that use "WiFi" ("Wireless Fidelity"), also known as "Wi-Fi," are relatively easy to install, convenient to use, and supported by the IEEE 802.11 standard. WiFi data networks also provide performance that makes WiFi a suitable alternative to a wired data network for many business and home users.

WiFi networks operate by employing wireless access points that provide users, having wireless (or "client") devices in proximity to the access point, with access to varying types of data networks such as, for example, an Ethernet network or the Internet. The wireless access points include a radio that operates according to one of three standards specified in different sections of the IEEE 802.11 specification. Generally, radios in the access points communicate with client devices by utilizing omni-directional antennas that allow the radios to communicate with client devices in any direction. The access points are then connected (by hardwired connections) to a data network system that completes the access of the client device to the data network.

The three standards that define the radio configurations are:

1. IEEE 802.11a, which operates on the 5 GHz frequency band with data rates of up to 54 Mbs;
2. IEEE 802.11b, which operates on the 2.4 GHz frequency band with data rates of up to 11 Mbs; and
3. IEEE 802.11g, which operates on the 2.4 GHz frequency band with data rates of up to 54 Mbs.

The 802.11b and 802.11g standards provide for some degree of interoperability. Devices that conform to 802.11b may communicate with 802.11g access points. This interoperability comes at a cost as access points will switch to the lower data rate of 802.11b if any 802.11b devices are connected. Devices that conform to 802.11a may not communicate with either 802.11b or 802.11g access points. In addition, while the 802.11a standard provides for higher overall performance, 802.11a access points have a more limited range compared with the range offered by 802.11b or 802.11g access points.

Each standard defines 'channels' that wireless devices, or clients, use when communicating with an access point. The 802.11b and 802.11g standards each allow for 14 channels. The 802.11a standard allows for 23 channels. The 14 channels provided by 802.11b and 802.11g include only 3 channels that are not overlapping. The 12 channels provided by 802.11a are non-overlapping channels.

Access points provide service to a limited number of users. Access points are assigned a channel on which to communicate. Each channel allows a recommended maximum of 64 clients to communicate with the access point. In addition, access points must be spaced apart strategically to reduce the chance of interference, either between access points tuned to the same channel, or to overlapping channels. In addition, channels are shared. Only one user may occupy the channel at any give time. As users are added to a channel, each user must wait longer for access to the channel thereby degrading throughput.

One way to increase throughput is to employ multiple radios at an access point. Another way is to use multiple input, multiple output ("MIMO") to communicate with mobile devices in the area of the access point. MIMO has the advantage of increasing the efficiency of the reception. However, MIMO entails using multiple antennas for reception and transmission at each radio. The use of multiple antennas may create problems with space on the access point, particularly when the access point uses multiple radios. In some implementations of multiple radio access points, it is desirable to implement a MIMO implementation in the same space as a previous non-MIMO implementation.

Current MIMO implementations may utilize 2-3 antennas per radio. When more than one antenna is used, the mutual coupling among the antennas due to their proximity may degrade the performance of the access point and reduce the throughput. The problem with mutual coupling is magnified when multiple radios are used in an access point.

It would be desirable to implement MIMO in multiple radio access points without significant space constraints such that it would be possible to substitute a non-MIMO multiple radio access point with a MIMO multiple radio access point in the same space. It would also be desirable to implement MIMO in a multiple radio access point while maximizing the performance of the access point in coverage and quality of service (QOS).

SUMMARY

In view of the above, an antenna system is provided for connecting to a radio in a Multiple-Input, Multiple-Output (MIMO) arrangement and configured to communicate in an area of coverage. The antenna system includes a plurality of antenna elements, and the plurality of antenna elements further includes a first plurality of antenna elements configured to communicate on a first frequency band and a second plurality of antenna elements configured to communicate on a second frequency band. A plurality of MIMO-configured radio ports on the radio communicates radio signals to and from the antenna elements. A beam-forming network is connected to at least two of the first plurality of antenna elements and to at least two radio ports. The beam-forming network is configured to form space diversity beams in the area of coverage.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The examples of the invention described below can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

A wireless local area network ("WLAN") access device that uses a MIMO antenna array is disclosed. The WLAN access device may include a circular housing having a plurality of radial sectors and a plurality of antenna arrays, each antenna array arranged within individual radial sectors of the plurality of radial sectors.

In general, the antenna arrays used in the WLAN access device include multi-sector antenna systems that radiate a plurality of radiation patterns that "carve" up the airspace into equal sections of space or sectors to assure continuous coverage for a client device in communication with the WLAN. The WLAN antenna arrays provide increased directional transmission and reception gain that allow the WLAN and its respective client devices to communicate at greater distances than standard omni-directional antenna systems, thus producing an extended coverage area when compared to an omni-directional antenna system.

Examples of implementations of a WLAN antenna array in which multiple input, multiple output ("MIMO") schemes may be implemented, and in which example implementations consistent with the present invention may also be implemented are described in:

PCT Patent Application No. PCT/US2006/008747, filed on Jun. 9, 2006, titled "WIRELESS LAN ANTENNA ARRAY," and incorporated herein by reference in its entirety, U.S. patent application Ser. No. 12/269,567, filed on Nov. 8, 2008, titled "MIMO Antenna System," and incorporated herein by reference in its entirety; and U.S. patent application Ser. No. 12/987,040, filed on Dec. 31, 2010, titled "MIMO Antenna System," and incorporated herein by reference in its entirety.

Figure 1:
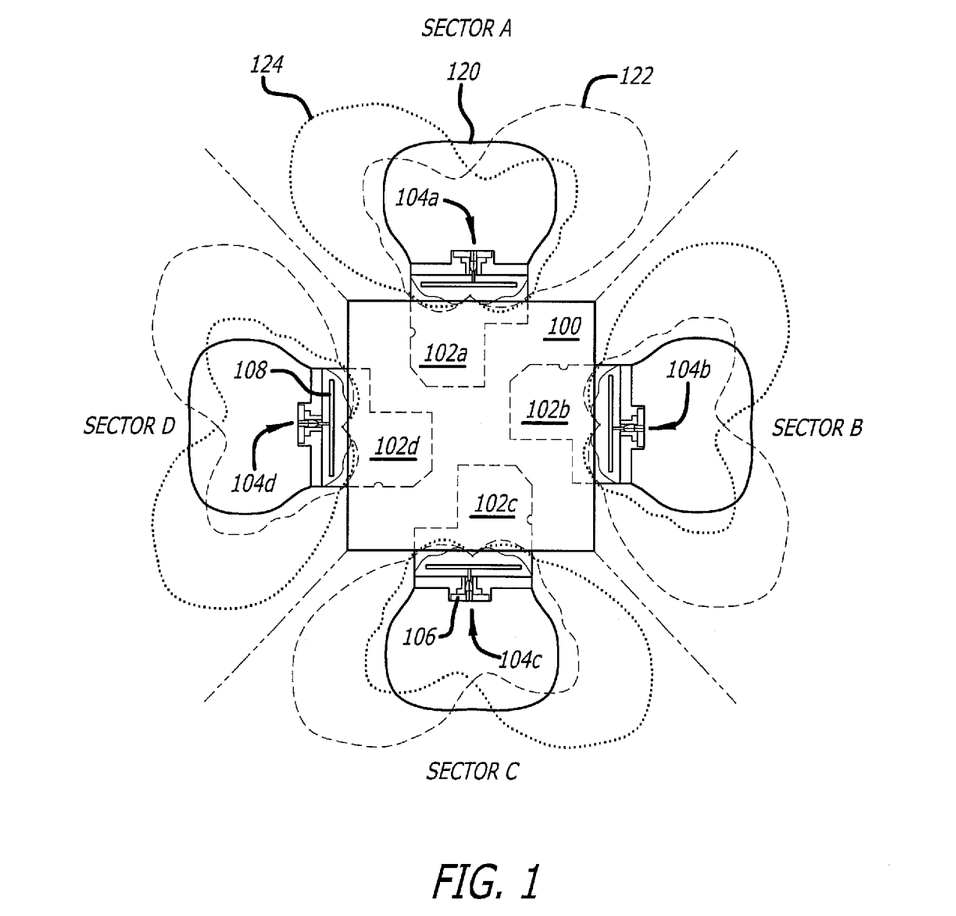
FIG. 1 is a top view of an example of a wireless local area network ("WLAN") access device and coverage pattern for the device while operating according to the IEEE 802.11 a\n standard.

FIG. 1 is a schematic diagram of an example of a WLAN access device 100 and coverage pattern for the device 100 while operating according to the IEEE 802.11an standard. The WLAN access device 100 includes four radio modules 102a-d arranged to divide the coverage area of the device 100 into four radial sectors A, B, C, D. Each radio module 102a-d generates the coverage pattern in its corresponding sector.

The radio modules 102a-d are mounted on a printed circuit board that may also include controller circuitry for controlling the wireless access functions according to 802.11abgn, and to provide an interface to data network services. Clients that communicate wirelessly with the radio modules 102a-d may obtain data network services through the access device 100. Each radio module 102a-d includes an antenna array 104a-d configured to receive and/or transmit signals between clients and the radio modules 102a-d. Each antenna array 104a-d includes an embedded antenna element 106 and a vertical antenna element 108. The embedded antenna element 106 and vertical antenna element 108 may include antenna elements oriented and connected as a beam-forming network.

In an example implementation and referring to the radio module 102a for sector 'A,' the embedded antenna element 106a of the antenna array 104a may be aimed at the center along the bore sight of sector A. The vertical antenna elements 108a include a pair of antenna elements driven through a 90° hybrid configured as a Butler Matrix. The 90° hybrid Butler Matrix forms a two element array with two beams (right and left beams) squinted from each other relative to the antennas physical bore sight. The two beams are space diversity beams aimed at different portions of the space in the sector. In FIG. 1, the single embedded antenna element 106a forms a center beam 120 in Sector A. A right one of the vertical antenna elements 108a forms a right beam 122 and a left one of the vertical antenna elements 108a forms a left beam 124 in Sector A. Each of the other three radio modules 102b-d form similar right, center, and left beams in their corresponding sectors to provide a 365° coverage area while operating, for example, according to the IEEE 802.11an standard.

Figure 2:
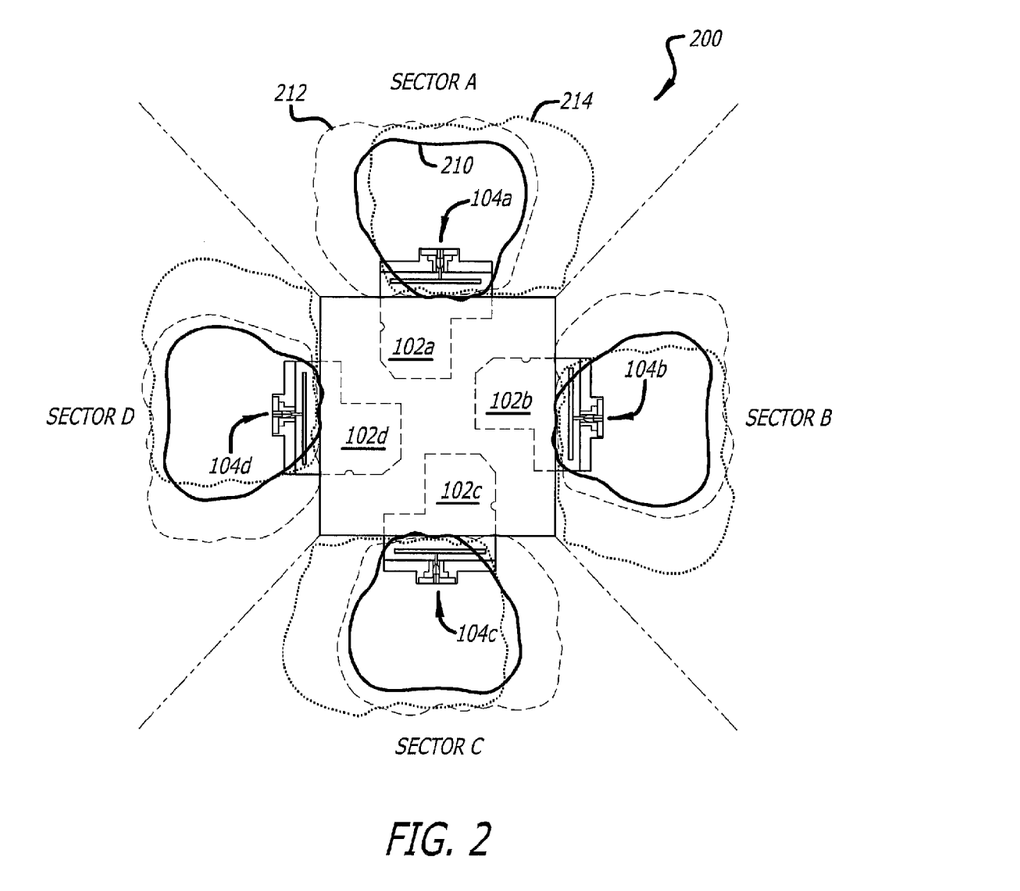
FIG. 2 is a top view of the WLAN access device in FIG. 1 and coverage pattern for the device while operating according to the IEEE 802.11 b\g\n standard.

FIG. 2 is a schematic diagram of the WLAN access device 100 in FIG. 1 and coverage pattern for the device 100 while operating according to the IEEE 802.11bgn standard. As shown in FIG. 2, the WLAN access device 100 includes the radio modules 102a, 102b, 102c, 102d arranged as described with reference to FIG. 1. Each radio module 102a-d is connected to communicate via the corresponding antenna arrays 104a-d. The antenna arrays 104a-d operate in a MIMO scheme and include antenna elements that receive and transmit signals according to the 802.11bgn standard. The antenna elements may be arranged in the antenna arrays 104a-d to provide suitable coverage patterns for MIMO operation with space diversity similar to the configuration described above with reference to FIG. 1, or with polarization diversity. The antenna arrays 104a-d may produce coverage patterns in Sectors A, B, C, and D as shown in FIG. 2. For example, the antenna array 104a in the radio module 102a serving sector A may be configured to produce a center beam 210, a left beam 212, and a right beam 214.

In an example implementation, the radio modules 102a-d and antenna arrays 104a-d operate according to both the 802.11an and 802.11bgn standards. At any given time, the radio modules 102a-d and antenna arrays 104a-d may generate the coverage patterns shown for sectors A, B, C, and D in both FIGS. 1 and 2 to enable communication with clients that operate according to either standard and that may be in within the coverage patterns.

Figure 3A:
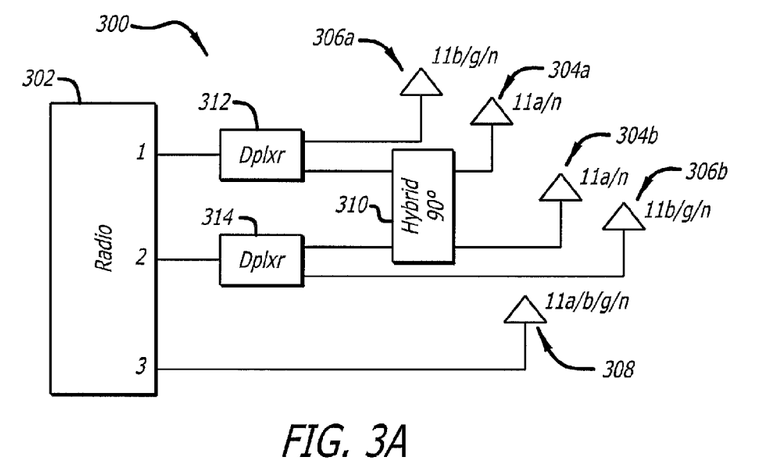
FIG. 3A is a block diagram of an example of a radio transceiver and antenna arrays configured to operate in a MIMO scheme.
Figure 3B:
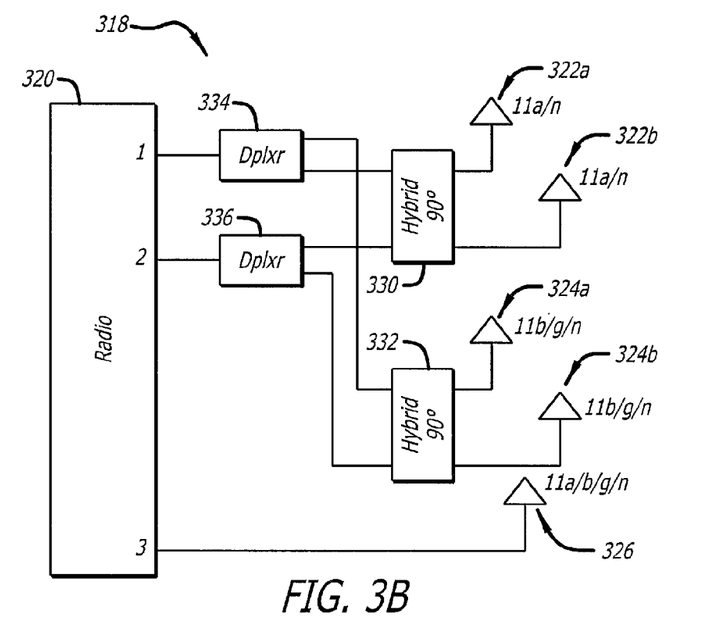
FIG. 3B is a block diagram of an example of a radio transceiver and antenna arrays configured to operate in a MIMO scheme.

FIGS. 3A and 3B are block diagrams of alternative implementations for generating space diversity and polarization diversity to obtain coverage patterns such as those illustrated for the radio modules 102a-d in FIGS. 1 and 2. FIG. 3A is a block diagram of an example of a radio chain 300 that includes a radio transceiver 302 and antenna arrays configured to operate in a MIMO scheme for the 802.11an and 802.11bgn standards. The antenna arrays include a first 11an antenna element 304a, a second 11an antenna element 304b, a first 11bgn antenna element 306a, a second 11bgn antenna element 306b, and a 11abgn antenna element 308.

The first and second 11an antenna elements 304a,b and the 11abgn antenna element 308 are configured to provide the coverage pattern described above with reference to FIG. 1 for clients in the coverage area that communicate using the 802.11an standard with space diversity.

The space diversity may be achieved using a beamforming network having a Butler matrix that includes a 90° hybrid 310 having four hybrid ports, which include two antenna side hybrid ports and two radio side hybrid ports. The first and second 11an antenna elements 304a,b are connected to the two antenna side hybrid ports of the 90° hybrid 310. The two radio side hybrid ports of the 90° hybrid 310 connect to first and second diplexers 312, 314.

The first and second diplexers 312, 314 each include two antenna side diplexer ports and one radio side diplexer port. The radio side diplexer port of the first diplexer 312 connects to a first radio port of radio transceiver 302. The radio side diplexer port of the second diplexer 314 connects to a second radio port of radio transceiver 302. The first and second diplexers 312, 314 operate as dual-channel multiplexers. For example, signals coupled to the first and second antenna side diplexer ports on the first diplexer 312 are combined (multiplexed) and output at the radio side diplexer port of the first diplexer 312. Signals coupled to the radio side diplexer port are uncombined (demultiplexed) and output as two separated signals at the first and second antenna side diplexer ports of the first diplexer 312. One of the two radio side hybrid ports of the 90° hybrid 310 connects to a first antenna side diplexer port on the first diplexer 312 for multiplexing with a 802.11bgn signal via the first 11bgn antenna element 306a connected to the second antenna side diplexer port. The other of the two radio side hybrid ports of the 90° hybrid 310 connects to a first antenna side diplexer port of the second diplexer port 314 for multiplexing with another 802.11bgn signal via the second bgn antenna element 306b.

During signal reception, the first diplexer 312 may combine a 802.11an signal from the first antenna side hybrid port with a 802.11bgn signal from the first bgn antenna element 306a and couple the combined signal to the first radio port of the radio transceiver 302. During signal transmission, the first diplexer 312 may uncombine a signal received from the first radio port of the radio transceiver 302 and couple the 'an' signal to the first antenna side hybrid port and the 'bgn' signal to the first bgn antenna element 306a. Similarly, during signal reception, the second diplexer 314 may combine a 802.11an signal from the second antenna side hybrid port with a 802.11bgn signal from the second bgn antenna element 306b and couple the combined signal to the second radio port of the radio transceiver 302. During signal transmission, the second diplexer 314 may uncombine a signal received from the second radio port of the radio transceiver 302 and couple the 'an' signal to the second antenna side hybrid port and the 'bgn' signal to the second bgn antenna element 306b. The 11abgn antenna element 308 connects directly to a third radio port of the radio transceiver 302 and fills the center along the bore sight to generate the center beam 210 (FIG. 2). The 11bgn antenna elements 306a,b and the 11abgn antenna element 308 are not connected to any beam-forming components and instead form polarization diversity beams. The polarization diversity arrangement of the beams is a result of the physical arrangement of the 11bgn and 11abgn antenna elements 306a,b, 308.

The first and second 11an antenna elements 306a,b and beam-forming network form a two-element array with two higher gain beams (such as right beam 122 and left beam 124 in FIG. 1) squinted from each other relative to the antennas' physical bore sight. The 11abgn antenna element 308 is a low gain antenna element that fills the center along the bore sight.

FIG. 3B is a block diagram of another example of a radio chain 318 that includes a radio transceiver 320 and antenna arrays configured to operate in a MIMO scheme. In the example illustrated in FIG. 3B, both the 802.11an and the 802.11bgn antenna arrays operate using space diversity to generate coverage patterns as described above with reference to FIG. 1. The space diversity may be achieved by connecting a first 11an antenna element 322a and a second 11an antenna elements 322b to the antenna side hybrid ports of a first 90° hybrid 330. Similarly, a first 11bgn antenna element 324a and a second 11bgn antenna elements 324b are connected to the antenna side hybrid ports of a second 90° hybrid 332. One of the radio side hybrid ports of the first 90° hybrid 330 is connected to an antenna side diplexer port of a first diplexer 334, and the other radio side port of the first 90° hybrid 330 is connected to an antenna side diplexer port of a second diplexer 336. One of the radio side ports of the second 90° hybrid 332 is connected to the other antenna side diplexer port of the first diplexer 334, and the other radio side port of the second 90° hybrid 332 is connected to the other antenna side diplexer port of the second diplexer 336. The radio side diplexer ports of the two diplexers 334, 336 are connected to the first and second radio ports of the radio transceiver 320. A 11abgn antenna element 326 connects directly to a third port on the radio transceiver 320.

Both radio chain implementations illustrated in FIGS. 3A and 3B may be used to implement a 2×3 or 3×3 MIMO scheme using either or both 802.11an or 802.11bgn standards.

Figure 4A:
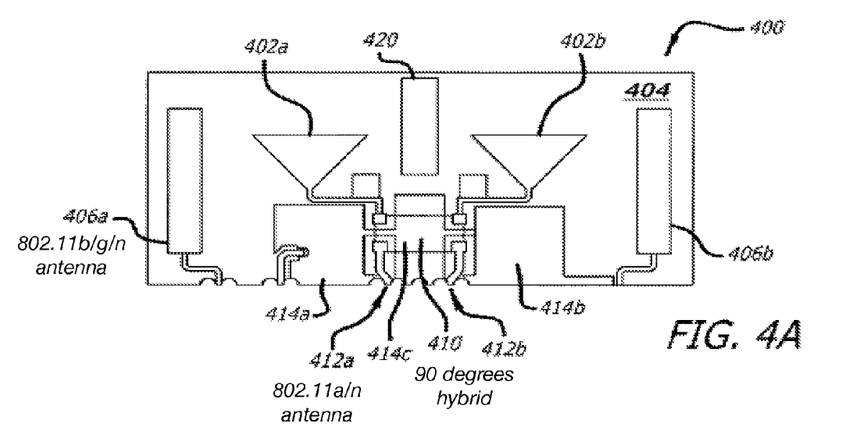
FIG. 4A is a schematic diagram illustrating an example implementation of a first set of antenna elements in antenna arrays that may be used in the example radios illustrated in FIGS. 3A and 3B.

FIG. 4A is a schematic diagram illustrating a vertical antenna component 400 having a first set of antenna elements in antenna arrays that may be used in the example radio chain 300 illustrated in FIG. 3A. The vertical antenna component 400 in FIG. 4A includes a first antenna element 802.11an 402a, a second antenna element 802.11an 402b, a first 802.11bgn antenna element 406a, second 802.11bgn antenna element 406b, a choke 420, a first 802.11an beam input 412a, a second 802.11an beam input 412b, and a 90° hybrid 410 formed on a printed circuit board 404. The vertical antenna component 400 may be mounted to extend perpendicularly from the RF module 102 (in FIG. 1) printed circuit board. The RF module 102 in example implementations may be oriented horizontally in a WLAN mounted overhead, such as on a ceiling. The vertical antenna component 400 on a horizontally mounted RF module 102 would then be oriented vertically. It is to be understood that example implementations of the WLAN access device 102 may be oriented in any suitable manner and that the designation of example components as having horizontal and vertical orientations are for purposes of illustration.

In the vertical antenna component 400 in FIG. 4A, the first 802.11bgn antenna element 406a includes a first quarterwave monopole antenna element located on one end of the printed circuit board 404. The second 802.11bgn antenna element 406b includes a second quarterwave monopole antenna element located on the other end of the printed circuit board 404. The first 802.11bgn antenna element 406a and second 802.11bgn antenna element 406b quarterwave monopoles are maintained physically separated to minimize correlation between them. The quarterwave monopole antenna elements may be metallic layers printed on the printed circuit board and fed against the RF module 102 PCB ground. The monopole antenna elements are formed so that the monopole orients vertically relative to the RF module 102 printed circuit board (FIG. 1).

The first antenna element 802.11an 402a and the second antenna element 802.11an 402b each include broadband monopoles fed against first and second ground metallization areas 414a,b. The broadband monopoles that form the first antenna element 802.11an 402a and the second antenna element 802.11an 402b may be formed in any suitable manner that provides radiation patterns with higher directivity. The first antenna element 802.11an 402a and the second antenna element 802.11an 402b are separated by a choke 420 to enhance isolation between them.

The first antenna element 802.11an 402a and the second antenna element 802.11an 402b connect to two of four ports on the 90° hybrid 410. The 90° hybrid 410 extends opposite a third ground metallization layer 414c, which is connected to the first ground metallization layer 414a and the second ground metallization layer 414b. The other two ports of the 90° hybrid 410 connect to an edge connector forming a first 802.11an beam feed 412a and a second 802.1.1an beam feed 412b. The first and second 802.11an beam feeds 412a,b are connected at the edge connector to feed lines on the RF module 102 to connect to the remaining components in the radio chain 300 (in FIG. 3A).

In an example implementation, the radiation patterns formed by the antenna elements on the vertical antenna component 400 may be enhanced using a reflector, which may be part of a main shield wall. The main shield wall may be placed about a quarter wavelength (λ/4) behind the vertical antenna component 400; that is, opposite the side of the vertical antenna component 400 from which the radiation pattern is formed. The reflector and main shield wall are described in more detail below with reference to FIG. 5.

Figure 4B:
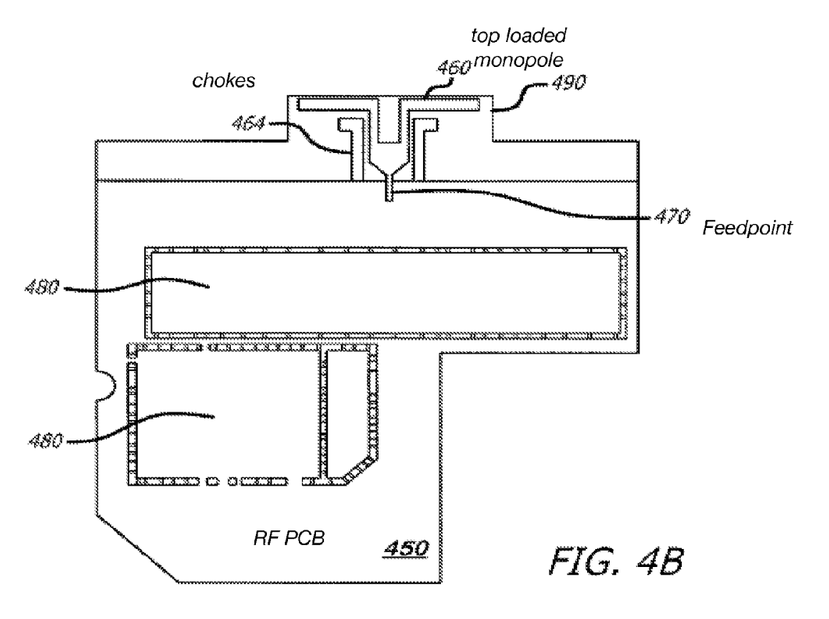
FIG. 4B is a schematic diagram illustrating an example implementation of a second set of antenna elements in antenna arrays that may be used in the example radios illustrated in FIGS. 3A and 3B.

FIG. 4B is a schematic diagram illustrating an example implementation of a second set of antenna elements in antenna arrays that may be used in the example radios illustrated in FIGS. 3A and 3B. FIG. 4B shows an RF PCB 450 on which is mounted digital/analog circuitry 480, a 802.11abgn antenna element 460, chokes 464, and a feedpoint 470. The 802.11abgn antenna element 460 may implement the 802.11abgn antenna elements 308 (in FIG. 3A) and 326 (in FIG. 3B). The 802.11abgn antenna element 460 may be a dual-band top-loaded monopole that uses the knife edge ground of the RF PCB 450. The 802.11abgn antenna element 460 is oriented orthogonal to the other antenna elements, which are on the vertical antenna component 400, to help minimize the correlation among the antennas.

The 802.11abgn antenna elements 460 are printed on the RF PCB 450 at an edge of the RF PCB 450 from which radiation patterns are formed. The vertical antenna component 400 may be positioned between the 802.11abgn antenna element 460 and the digital/analog circuitry 480. A pair of choke elements 464 is formed on opposite sides of the 802.11abgn antenna element 460 to enhance the dual-band response of the antenna array.

The digital/analog circuitry 480 may include the radio transceiver, diplexers and any other suitable circuitry used to connect the antennas to the radio transceiver and the radio transceiver to a data network. The 802.11abgn antenna element 460 may connect to the radio transceiver on the RF PCB 450 via the feedpoint 470.

Figure 5:
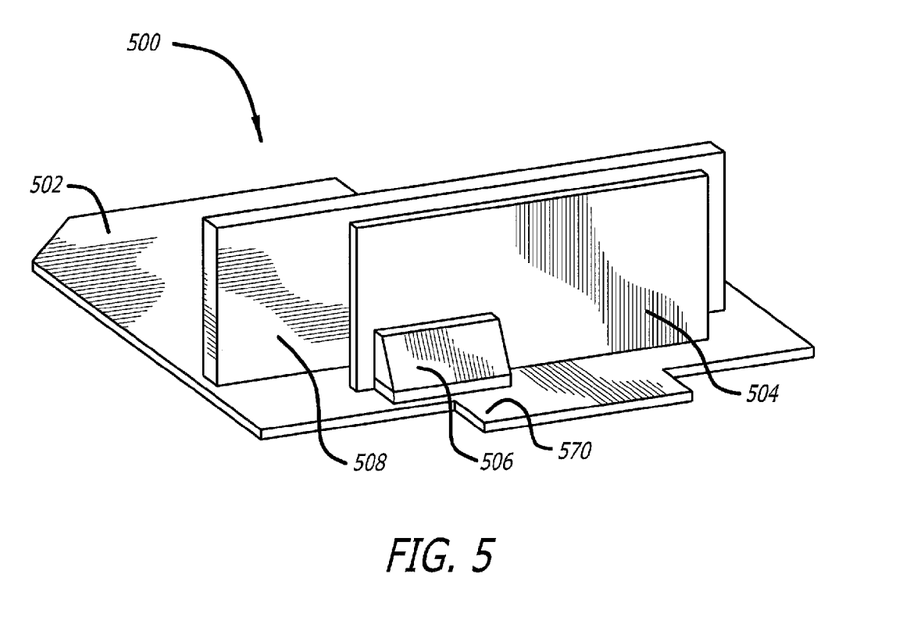
FIG. 5 is a perspective view of a radio module of a type that may be implemented in examples of the WLAN access devices shown in FIGS. 1 and 2.

FIG. 5 is a perspective view of a radio module 500 of a type that may be implemented in examples of the WLAN access devices shown in FIGS. 1 and 2. The radio module 500 is shown without most of the components used for operation. The radio module 500 in FIG. 5 includes a component surface 502 form mounting the electronic components used for operation, a vertical antenna component 504, a vertical antenna component support 506, a main shield wall 508, and a radiation edge 510.

The vertical antenna component 504 may include the vertical antenna component 400 described above with reference to FIG. 4. A similar vertical antenna component may be used to implement the radio chain 318 in FIG. 3B. The vertical antenna component support 506 may be used to attach the vertical antenna component 504 to the RF module 500 PCB and to maintain the vertical antenna component 506 orthogonal to the RF module 500. The vertical antenna component support 506 may also include connectors for connecting the circuitry on the vertical antenna component support 506 to the circuitry on the RF module 500 PCB. Connectors for connecting the circuitry on the vertical antenna component support 506 to the circuitry on the RF module 500 PCB may also be included along any part of the edge of the vertical antenna component 504 that contacts the RF module 500 PCB.

The vertical antenna component 504 may be mounted between the radiation edge 510 and the main shield wall 508. The main shield wall 508 includes a reflector that may be used by both the 802.11a/n and 802.11bgn antenna elements to enhance gain/directivity. The vertical antenna component 504 may be placed about a quarter wavelength (λ/4) in front of the reflector on the main shield wall 508. The reflector may enhance the gain/directivity of the antenna elements by narrowing the azimuth beams, for example right beam 122 and left beam 124 (in FIG. 1).

It will be understood that the foregoing description of numerous implementations has been presented for purposes of illustration and description. It is not exhaustive and does not limit the claimed inventions to the precise forms disclosed. For example, the above examples have been described as implemented according to IEEE 802.11a and 802.11bg. Other implementations may use other standards. In addition, examples of the wireless access points described above may use housings of different shapes, not just round housing. The number of radios in the sectors and the number of sectors defined for any given implementation may also be different. Modifications and variations are possible in light of the above description or may be acquired from practicing the invention. The claims and their equivalents define the scope of the invention.

What is claimed is:

1. An antenna system connected to a radio in a Multiple-Input, Multiple-Output (MIMO) arrangement, the antenna system and the radio mounted on an access point module comprising at least a second antenna system connected to a second radio and configured to communicate with clients in a first sector of an area of coverage, the at least second antenna system and connected radio being configured to communicate with clients in a second sector of the area of coverage, the antenna system comprising:

a first plurality of antenna elements configured to communicate on a first frequency band and a second plurality of antenna elements configured to communicate on a second frequency band, the first plurality of antenna elements comprising a center antenna element to produce a center beam, a first side antenna element to produce a right beam covering a space substantially to the right of the center beam, and a second side antenna element to produce a left beam covering a space substantially to the left of the center beam;

a plurality of MIMO-configured radio ports for communicating radio signals to and from the first plurality and the second plurality of antenna elements;

a beam-forming network comprising a Butler matrix having at least one 90° hybrid, connected to the first side antenna element and the second side antenna element of the first plurality of antenna elements and to at least two radio ports, the beam-forming network configured to form the right beam and the left beam such that the right beam is squinted from the left beam;

where the at least one 90° hybrid includes two antenna side hybrid ports and two radio side hybrid ports;

where:
  a first one of the two antenna side hybrid ports is connected to the first side antenna element;
  a second one of the two antenna side hybrid ports is connected to the second side antenna element;
  a first one of the two radio side hybrid ports is connected to a first one of the MIMO-configured radio ports; and
  a second one of the two radio side hybrid ports is connected to a second one of the MIMO-configured radio ports;

a first diplexer having two antenna side diplexer ports and one radio side diplexer port, the radio side diplexer port connected to the first one of the MIMO-configured radio ports; and a second diplexer having two antenna side diplexer ports and one radio side diplexer port, the radio side diplexer port connected to the second one of the MIMO-configured radio ports;

where:
  the first one of the two radio side hybrid ports is connected to the first one of the MIMO-configured radio ports via a first antenna side diplexer port of the first diplexer;
  the second one of the two radio side hybrid ports is connected to the second one of the MIMO-configured radio ports via a first antenna side diplexer port of the second diplexer;
  a first one of the second plurality of antenna elements is connected to a second antenna side diplexer port of the first diplexer, the first diplexer configured to multiplex and demultiplex signals communicated at the first and the second frequency bands received from the first one of the two radio side hybrid ports and from the first one of the second plurality of antenna elements; and
  a second one of the second plurality of antenna elements is connected to a second antenna side diplexer port of the second diplexer, the second diplexer configured to multiplex and demultiplex signals communicated at the first and the second frequency bands received from the second one of the two radio side hybrid ports and from the second one of the second plurality of antenna elements.

2. The antenna system of claim 1 where the center element of the first plurality of antenna elements is configured to communicate on both the first and the second frequency bands.

3. The antenna system of claim 2 where the at least one 90° hybrid includes a first 90° hybrid and a second 90° hybrid, each of the first and the second 90° hybrid having two antenna side hybrid ports and two radio side hybrid ports, the antenna system further comprising:
  a first diplexer having two antenna side diplexer ports and one radio side diplexer port, the radio side diplexer port connected to a first one of the MIMO-configured radio ports; and
  a second diplexer having two antenna side diplexer ports and one radio side diplexer port, the radio side diplexer port connected to a second one of the MIMO-configured radio ports;

where:
    the two antenna side hybrid ports of the first 90° hybrid are connected to the first and the second side antenna elements of the first plurality of antenna elements;
    the two antenna side hybrid ports of the second 90° hybrid are connected to corresponding ones of two of the second plurality of antenna elements;
    a first one of the two radio side hybrid ports of the first 90° hybrid is connected to a first one of the two antenna side diplexer ports of the first diplexer;
    a first one of the two radio side hybrid ports of the second 90° hybrid is connected to a second one of the two antenna side diplexer ports of the first diplexer;
    a second one of the two radio side hybrid ports of the first 90° hybrid is connected to a first one of the two antenna side diplexer ports of the second diplexer;
    a second one of the two radio side hybrid ports of the second 90° hybrid is connected to a second one of the two antenna side diplexer ports of the second diplexer; and
    where the first and the second diplexers are configured to multiplex and demultiplex signals communicated at the first and the second frequency bands via space diversity beams formed by both the first and the second plurality of antenna elements.

4. The antenna system of claim 3 where the center antenna element is configured to communicate on both the first and the second frequency bands.

5. The antenna system of claim 1 where the first plurality of antenna elements is configured to communicate on the first frequency band defined by the Institute of Electrical and Electronics Engineers (IEEE) 802.11 a/n standard and the second plurality of antenna elements is configured to communicate on the second frequency band defined by the IEEE 802.11 b/g/n standard.

6. The antenna system of claim 1 where the center antenna element of the first plurality of antenna elements is configured to be in polarization diversity with the first and the second side antenna elements of the first plurality of antenna elements.

7. The antenna system of claim 1 where the second plurality of antenna elements comprises a center antenna element to produce a center beam, a first side antenna element to produce a right beam covering a space substantially to the right of the center beam, and a second side antenna element to produce a left beam covering a space substantially to the left of the center beam.

8. The antenna system of claim 7, where the center antenna element and the first and the second side antenna elements of the second plurality of antenna elements are mounted so that the center, right and left beams are in a polarization diversity arrangement.

9. A radio frequency ("RF") module configured to operate in a wireless local area network ("WLAN") access device to communicate wirelessly in a sector of an area of coverage of the access device, the RF module comprising:
  a first plurality of antenna elements configured to communicate on a first frequency band and a second plurality of antenna elements configured to communicate on a second frequency band, the first plurality of antenna elements comprising a center antenna element to produce a center beam, a first side antenna element to produce a right beam covering a space substantially to the right of the center beam, and a second side antenna element to produce a left beam covering a space substantially to the left of the center beam;

a radio transceiver having a plurality of Multiple-Input, Multiple-Output (MIMO) configured radio ports for communicating radio signals to and from the first plurality and the second plurality of antenna elements;

a beam-forming network comprising a Butler matrix having at least one 90° hybrid, connected to the first side antenna element and the second side antenna element of the first plurality of antenna elements and to at least two radio ports, the beam-forming network configured to form the right beam and the left beam such that the right beam is squinted from the left beam;

where the at least one 90° hybrid includes two antenna side hybrid ports and two radio side hybrid ports;

where:
  a first one of the two antenna side hybrid ports is connected to the first side antenna element;
  a second one of the two antenna side hybrid ports is connected to the second side antenna element;
  a first one of the two radio side hybrid ports is connected to a first one of the MIMO-configured radio ports; and
  a second one of the two radio side hybrid ports is connected to a second one of the MIMO-configured radio ports;

a first diplexer having two antenna side diplexer ports and one radio side diplexer port, the radio side diplexer port connected to the first one of the MIMO-configured radio ports; and a second diplexer having two antenna side diplexer ports and one radio side diplexer port, the radio side diplexer port connected to the second one of the MIMO-configured radio ports;

where:
  the first one of the two radio side hybrid ports is connected to the first one of the MIMO-configured radio ports via a first antenna side diplexer port of the first diplexer;
  the second one of the two radio side hybrid ports is connected to the second one of the MIMO-configured radio ports via a first antenna side diplexer port of the second diplexer;
  a first one of the second plurality of antenna elements is connected to a second antenna side diplexer port of the first diplexer, the first diplexer configured to multiplex and demultiplex signals communicated at the first and the second frequency bands received from the first one of the two radio side hybrid ports and from the first one of the second plurality of antenna elements; and
  a second one of the second plurality of antenna elements is connected to a second antenna side diplexer port of the second diplexer, the second diplexer configured to multiplex and demultiplex signals communicated at the first and the second frequency bands received from the second one of the two radio side hybrid ports and from the second one of the second plurality of antenna elements.

10. The RF module of claim 9 where the center element of the first plurality of antenna elements is configured to communicate on both the first and the second frequency bands.

11. The RF module of claim 10 where the at least one 90° hybrid includes a first 90° hybrid and a second 90° hybrid, each of the first and the second 90° hybrid having two antenna side hybrid ports and two radio side hybrid ports, the antenna system further comprising:

a first diplexer having two antenna side diplexer ports and one radio side diplexer port, the radio side diplexer port connected to the first one of the MIMO-configured radio ports; and a second diplexer having two antenna side diplexer ports and one radio side diplexer port, the radio side diplexer port connected to the second one of the MIMO-configured radio ports;

where:
  the two antenna side hybrid ports of the first 90° hybrid are connected to the first and second side antenna elements of the first plurality of antenna elements;
  the two antenna side hybrid ports of the second 90° hybrid are connected to corresponding ones of two of the second plurality of antenna elements;
  a first one of the two radio side hybrid ports of the first 90° hybrid is connected to a first one of the two antenna side diplexer ports of the first diplexer;
  a first one of the two radio side hybrid ports of the second 90° hybrid is connected to a second one of the two antenna side diplexer ports of the first diplexer;
  a second one of the two radio side hybrid ports of the first 90° hybrid is connected to a first one of the two antenna side diplexer ports of the second diplexer;
  a second one of the two radio side hybrid ports of the second 90° hybrid is connected to a second one of the two antenna side diplexer ports of the second diplexer; and
  where the first and the second diplexers are configured to multiplex and demultiplex signals communicated at the first and the second frequency bands via space diversity beams formed by both the first and the second plurality of antenna elements.

12. The RF module of claim 11 where the center antenna element is configured to communicate on both the first and the second frequency bands.

13. The RF module of claim 9 where the first plurality of antenna elements is configured to communicate on the first frequency band defined by the Institute of Electrical and Electronics Engineers (IEEE) 802.11 a/n standard and the second plurality of antenna elements is configured to communicate on the second frequency band defined by the IEEE 802.11 b/g/n standard.

14. The RF module of claim 9 where the RF module is connected to a controller of the WLAN access device, the controller being further connected to three other RF modules, each of the four RF modules being configured to communicate in a corresponding one of four radial sectors arranged to provide a 360° coverage area.

15. The radio module of claim 9 where the center antenna element of the first plurality of antenna elements is configured to be in polarization diversity with the first and the second side antenna elements of the first plurality of antenna elements.

16. The radio module of claim 9 where the second plurality of antenna elements comprises a center antenna element to produce a center beam, a first side antenna element to produce a right beam covering a space substantially to the right of the center beam, and a second side antenna element to produce a left beam covering a space substantially to the left of the center beam.

17. The radio module of claim 16, where the center antenna element and the first and second side antenna elements of the second plurality of antenna elements are mounted so that the center, right and left beams are in a polarization diversity arrangement.

18. A wireless local area network ("WLAN") access device comprising:
a plurality of radio frequency ("RF") modules connected to a controller and arranged to form corresponding radial sectors, each RF module having:
a first plurality of antenna elements configured to communicate on a first frequency band and a second plurality of antenna elements configured to communicate on a second frequency band, the first plurality of antenna elements comprising a center antenna element to produce a center beam, a first side antenna element to produce a right beam covering a space substantially to the right of the center beam, and a second side antenna element to produce a left beam covering a space substantially to the left of the center beam;
a radio transceiver having a plurality of Multiple-Input, Multiple-Output (MIMO) configured radio ports for communicating radio signals to and from the first and the second plurality of antenna elements; and
a beam-forming network comprising a Butler matrix having at least one 90° hybrid, connected to the first side antenna element and the second side antenna element of the first plurality of antenna elements and to at least two radio ports, the beam-forming network configured to form the right beam and the left beam such that the right beam is squinted from the left beam;
where the at least one 90° hybrid includes two antenna side hybrid ports and two radio side hybrid ports;
where:
a first one of the two antenna side hybrid ports is connected to the first side antenna element;
a second one of the two antenna side hybrid ports is connected to the second side antenna element;
a first one of the two radio side hybrid ports is connected to a first one of the MIMO-configured radio ports; and
a second one of the two radio side hybrid ports is connected to a second one of the MIMO-configured radio ports;
a first diplexer having two antenna side diplexer ports and one radio side diplexer port, the radio side diplexer port connected to the first one of the MIMO-configured radio ports; and
a second diplexer having two antenna side diplexer ports and one radio side diplexer port, the radio side diplexer port connected to the second one of the MIMO-configured radio ports;
where:
the first one of the two radio side hybrid ports is connected to the first one of the MIMO-configured radio ports via a first antenna side diplexer port of the first diplexer;
the second one of the two radio side hybrid ports is connected to the second one of the MIMO-configured radio ports via a first antenna side diplexer port of the second diplexer;
a first one of the second plurality of antenna elements is connected to a second antenna side diplexer port of the first diplexer, the first diplexer configured to multiplex and demultiplex signals communicated at the first and the second frequency bands received from the first one of the two radio side hybrid ports and from the first one of the second plurality of antenna elements; and
a second one of the second plurality of antenna elements is connected to a second antenna side diplexer port of the second diplexer, the second diplexer configured to multiplex and demultiplex signals communicated at the first and the second frequency bands received from the second one of the two radio side hybrid ports and from the second one of the second plurality of antenna elements.

19. The WLAN access device of claim 18 where the center element of the first plurality of antenna elements is configured to communicate on both the first and the second frequency bands.

20. The WLAN access device of claim 19 where in each RF module, the at least one 90° hybrid includes a first 90° hybrid and a second 90° hybrid, each of the first and the second 90° hybrid having two antenna side hybrid ports and two radio side hybrid ports, the antenna system further comprising:
a first diplexer having two antenna side diplexer ports and one radio side diplexer port, the radio side diplexer port connected to the first one of the MIMO-configured radio ports; and
a second diplexer having two antenna side diplexer ports and one radio side diplexer port, the radio side diplexer port connected to the second one of the MIMO-configured radio ports;
where:
the two antenna side hybrid ports of the first 90° hybrid are connected to the first and second side antenna elements of the first plurality of antenna elements;
the two antenna side hybrid ports of the second 90° hybrid are connected to corresponding ones of two of the second plurality of antenna elements;
a first one of the two radio side hybrid ports of the first 90° hybrid is connected to a first one of the two antenna side diplexer ports of the first diplexer;
a first one of the two radio side hybrid ports of the second 90° hybrid is connected to a second one of the two antenna side diplexer ports of the first diplexer;
a second one of the two radio side hybrid ports of the first 90° hybrid is connected to a first one of the two antenna side diplexer ports of the second diplexer;
a second one of the two radio side hybrid ports of the second 90° hybrid is connected to a second one of the two antenna side diplexer ports of the second diplexer; and
where the first and second diplexers are configured to multiplex and demultiplex signals communicated at the first and the second frequency bands via space diversity beams formed by both the first and the second plurality of antenna elements.

21. The WLAN access device of claim 20 where in each RF module, the center antenna element is configured to communicate on both the first and the second frequency bands.

22. The WLAN access device of claim 21 where in each RF module, the first plurality of-antenna elements is configured to communicate on the first frequency band defined by the Institute of Electrical Electronics Engineers (IEEE) 802.11 a/n standard and the second plurality of antenna elements is configured to communicate on the second frequency band defined by the IEEE 802.11 b/g/n standard.

23. The WLAN access device of claim 18 where the plurality of RF modules includes four RF modules configured to communicate in the four corresponding radial sectors arranged to provide a 360° coverage area.

24. The WLAN device of claim 18 where the center antenna element of the first plurality of antenna elements is configured to be in polarization diversity with the first and the second side antenna elements of the first plurality of antenna elements.

25. The WLAN device of claim 18 where the second plurality of antenna elements comprises a center antenna element to produce a center beam, a first side antenna element to produce a right beam covering a space substantially to the right of the center beam, and a second side antenna element to produce a left beam covering a space substantially to the left of the center beam.

26. The WLAN device of claim 25, where the center antenna element and the first and the second side antenna elements of the second plurality of antenna elements are mounted so that the center, right and left beams are in a polarization diversity arrangement.

* * * * *